Patented May 2, 1933

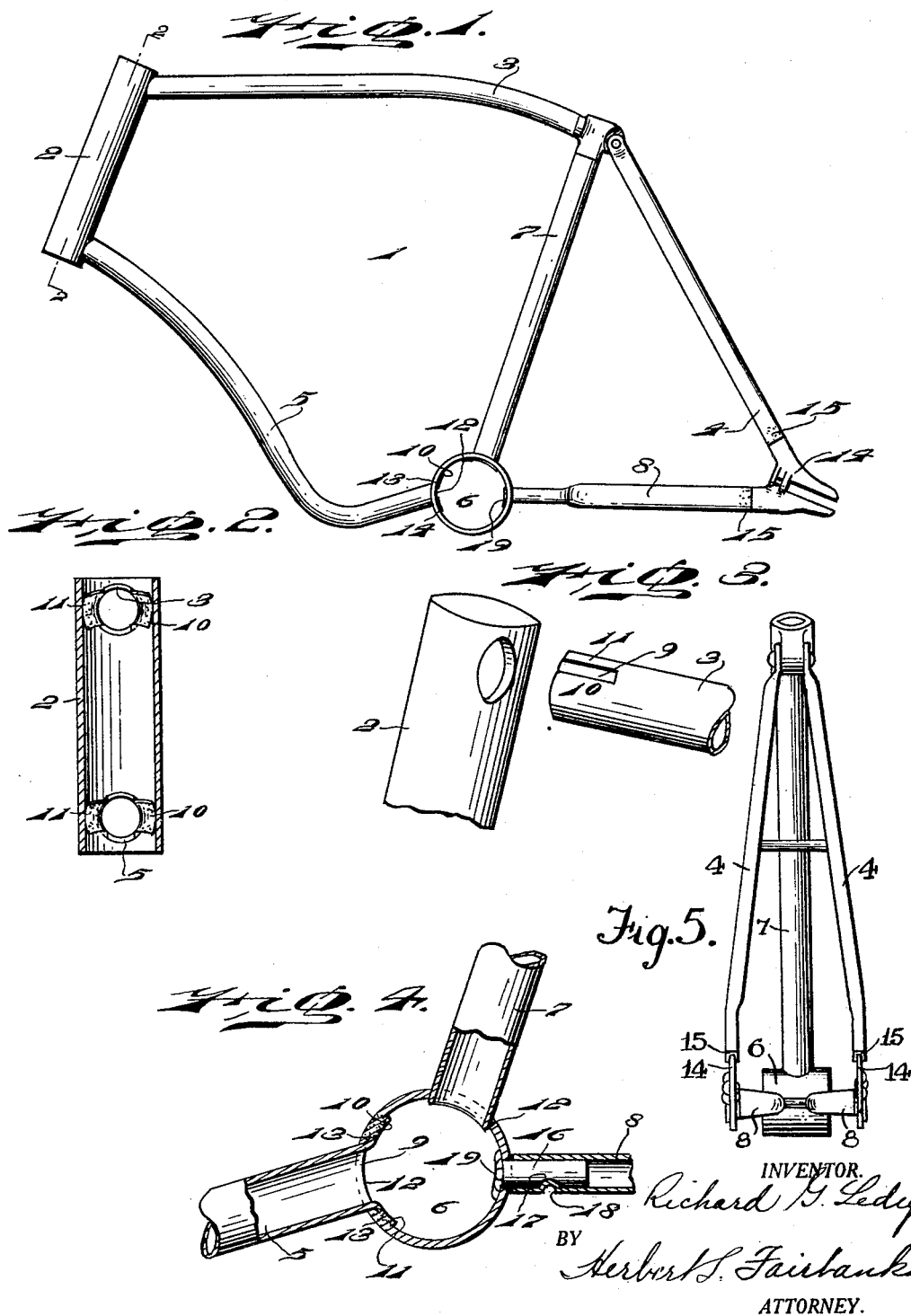

1,906,385

UNITED STATES PATENT OFFICE

RICHARD G. LEDIG, OF PHILADELPHIA, PENNSYLVANIA, ASSIGNOR TO E. C. BROWN CO., OF ROCHESTER, NEW YORK, A CORPORATION OF NEW YORK

BICYCLE FRAME AND METHOD OF MAKING IT

Application filed November 21, 1929. Serial No. 408,786.

In bicycle frame, as heretofore manufactured, it has been customary to telescope the parts together and secure them by brazing. This is not only an expensive operation but it is difficult to braze the parts together in such a manner that the brazing will not show in the finished product. This brazing operation involves considerable time and expense and also considerable time and expense in the proper finishing of the joints.

The object of my present invention is to overcome the difficulties which arise from a brazing operation and to connect the parts of the bicycle frame in such a manner that they can be spot welded. To the above end one of the brace is slotted to provide flanges which can be deflected over juxtaposed portions of the frame member to which it is to be secured and these flanges are then spot welded to firmly secure them in position.

A further object of the invention is to form a novel bicycle frame wherein one section is provided with a plug having recesses into which the metal of such section is indented to retain the plug in place, the plug being adapted to pass into and be swaged over the juxtaposed wall of the part to which it is connected.

With the above and other objects in view, as will hereinafter more clearly appear, my invention comprehends a novel bicycle frame and a novel method of making the frame and securing the parts together.

It further comprehends a novel construction and arrangement of cooperating parts which enable one to manufacture a bicycle frame having a uniform exterior surface.

Other novel features of construction and advantage will hereafter more clearly appear in the detailed description and the appended claims.

For the purpose of illustrating my invention, I have shown in the accompanying drawing a typical embodiment of it, which, in practice, will give satisfactory and reliable results. It is, however, to be understood that the various instrumentalities of which my invention consists can be variously arranged and organized and my invention is not limited to the exact arrangement and organization of the instrumentalities, as herein set forth.

Figure 1 is a side elevation of a bicycle frame embodying my invention.

Figure 2 is a section on line 2—2 of Figure 1, showing more particularly the manner in which the parts are united.

Figure 3 is a side elevation of the detached parts, showing more clearly the manner in which they are assembled.

Figure 4 is an enlarged side elevation and partial section of some of the members making up the frame illustrating the manner in which these parts are fastened together.

Fig. 5 is a side elevation looking toward the rear of the frame of Fig. 1.

Similar numerals of reference indicate corresponding parts.

Referring to the drawing:—

1 designates the bicycle frame embodying my invention. The frame 1 is provided with the head 2 which is connected by means of the top brace 3 with the rear fork 4. The bottom brace 5 is connected to the head 2 and to the sprocket housing 6 which latter is connected by the main brace 7 with the top brace 3 and the rear fork 4 and also with the lower extension 8 of the rear fork.

The above is the conventional arrangement of a bicycle frame and my present invention is directed particularly to the manner in which the parts of the frame are connected together to provide a construction which can be economically manufactured and which will be rigid and durable in practice.

The sections which make up the frame are secured together in a novel manner. The bottom brace 5 is slotted as at 9 to form the forwardly projecting prongs 10 and 11. These prongs are inserted into the opening 12 in the sprocket housing 6 and then pressed outwardly and rearwardly into close engagement with the juxtaposed inner wall of the sprocket housing. The prongs 10 and 11 are then spot welded to the sprocket chain housing as indicated at 13.

The top brace 3 and the bottom brace 5 are secured in a similar manner to the head 2. The brace 7 is spot welded to the sprocket housing 6 in a similar manner to that already described. The rear fork 4 and the lower brace members 8 are tubular to receive the bearing members 14 which telescope into them and such parts are spot welded together as at 15. The lower brace members 8 are tubular and receive the rods 16 which are provided with depressions 17 so that when they are inserted into the brace members 8 and a portion of the metal is deflected inwardly as at 18, they will enter the recesses 17 and securely retain the rods 16 in position. The free ends of the rods pass through openings in the sprocket housing 6 and are swaged over as indicated at 19. These may be spot welded if desired but the spot welding may be omitted and the parts held together by the swaging of the metal of the rods 16.

The rear fork 4 and the brace member 7 are connected to the top brace 3 in any desired or conventional manner.

In accordance with this invention I dispense with the brazing together of the frame sections which has heretofore been deemed necessary and which has been an expensive operation as considerable labor was necessary to obtain the proper finish after the brazing was completed.

By my present method of manufacture of bicycle frames, a rigid and durable frame can be made at a material reduction in cost over the frames as heretofore manufactured and also a better finish can be more economically obtained in the finished frame.

It will now be apparent that I have devised a new and useful bicycle frame and method of making it which embodies the features of advantage enumerated as desirable in the statement of the invention and the above description, and while I have, in the present instance, shown and described a preferred embodiment thereof which will give in practice satisfactory and reliable results, it is to be understood that this embodiment is susceptible of modification in various particulars without departing from the spirit or scope of the invention or sacrificing any of its advantages.

Having thus described my invention what I claim as new and desire to secure by Letters Patent, is:—

1. A bicycle frame having a top brace and a lower brace each being slotted at one end to provide prongs, a head into which said prongs extend and against which they are deflected and fixedly connected, a main brace connected with said top brace, a sprocket housing, said main brace and bottom brace being slotted to form prongs extending into said sprocket housing, outwardly deflected and fixed thereto, a rear fork connected with said top brace, lower brace members connected with said rear fork, and rods extending into the free ends of said lower brace members and having recesses into which the material of said brace members is deflected to secure them in place, said rods extending into said sprocket housing and being deflected and fixed thereto to secure the lower brace members with respect to the sprocket housing.

2. In a method of making a bicycle frame, the steps of spot welding the top brace and the bottom brace to the head, spot welding the bottom brace and an intermediate brace to the sprocket housing, spot welding a rear fork and lower rear fork braces to bearings, inserting rods in said lower braces and securing them therein by deflecting portions of such braces into recesses in the rods, inserting the rods through openings in the sprocket housing, and then swaging the rods to the sprocket housing.

3. The method of making a bicycle frame which consists in forming a head with openings and a sprocket housing with openings, slotting the forward end of a top brace and the ends of a bottom brace to form prongs, inserting the prongs at one end of the bottom brace and at the end of the top brace into the head, swaging them over and spot welding them to such head, securing the prongs at the other end of the brace in an opening of the housing by swaging them over and spot welding them to the housing, slotting the lower end of a main brace to form prongs, inserting such prongs in an opening in the housing, and swaging and spot welding such prongs to the housing, connecting a rear fork and the main brace with the top brace, attaching rear fork braces to said housing by inserting rods in the lower rear fork braces and through an opening in the housing, and swaging and spot welding them to the housing, and securing such rods to the lower rear fork braces by indenting the material of such braces into the rods.

RICHARD G. LEDIG.